United States Patent
Xu et al.

(10) Patent No.: US 7,876,356 B2
(45) Date of Patent: Jan. 25, 2011

(54) METHODS AND SYSTEMS FOR DISPLAY COLOR CALIBRATION USING REMOTE CONTROL

(75) Inventors: Ning Xu, Irvine, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1290 days.

(21) Appl. No.: 11/378,870

(22) Filed: Mar. 16, 2006

(65) Prior Publication Data

US 2007/0216772 A1 Sep. 20, 2007

(51) Int. Cl.
*H04N 17/02* (2006.01)
(52) U.S. Cl. ...................................... 348/184
(58) Field of Classification Search ......... 348/180–189, 348/192, 734, 552, 553, 177; 358/504
See application file for complete search history.

(56) References Cited

U.S. PATENT DOCUMENTS

| | | | | |
|---|---|---|---|---|
| 4,131,367 A | * | 12/1978 | French et al. | 356/405 |
| 5,483,259 A | * | 1/1996 | Sachs | 345/600 |
| 6,522,313 B1 | * | 2/2003 | Cottone | 345/22 |
| 6,618,076 B1 | * | 9/2003 | Sukthankar et al. | 348/180 |
| 6,798,444 B2 | * | 9/2004 | Adan | 348/189 |
| 6,850,245 B1 | * | 2/2005 | Murashita et al. | 345/589 |
| 7,265,794 B2 | * | 9/2007 | Bellis et al. | 348/655 |
| 2004/0196250 A1 | * | 10/2004 | Mehrotra et al. | 345/102 |

OTHER PUBLICATIONS

U.S. Appl. No. 11/128,761, N. Xu et al., filed May 12, 2005.

* cited by examiner

*Primary Examiner*—Paulos M Natnael
(74) *Attorney, Agent, or Firm*—Kenneth L. Sherman, Esq.; Michael Zarrabian, Esq.; Myers Andras Sherman & Zarrabian LLP

(57) ABSTRACT

A method and corresponding systems for using remote control to realize standard colors on displays. Two examples of remote controls are provided, one with color sensors and the other with white LEDs. For each example a calibration pattern is displayed which allows a user to calibrate the display color conveniently. For using the remote control with color sensors, an algorithm for the display to adjust the input RGB color, based on the color measurements from the remote control is provided. This allows the display output RGB color so that the display shows the same color as the input RGB signal is sent to standard color display.

30 Claims, 7 Drawing Sheets

500

METHODS AND SYSTEMS FOR DISPLAY COLOR CALIBRATION USING REMOTE CONTROL

FIELD OF THE INVENTION

The present invention relates generally to display calibration, and in particular to color accuracy of the display calibration process.

BACKGROUND OF THE INVENTION

Accurate color reproduction is essential for color display manufacturers. The goal of accurate color reproduction is to reproduce exactly the same colors on the display device as those colors are perceived by the human visual system. However, as most of the input and output devices are currently using device dependent color spaces, like RGB and YUV color spaces, to represent colors, reproducing accurate color turns out to be extremely difficult. To make the color reproduction easier, the television industry sets some color standards so that if both input device and output device comply with the standard, essentially accurate color could be reproduced. However, it is still difficult and expensive to completely comply with the color standard, even with the traditional CRT phosphors. The situation becomes more difficult as new display technologies such as LCD, DLP and PDP develop. Usually, a professional color calibration is needed to achieve better color reproduction of the high end TV displays.

In order to comply with a color standard, three points are important for display manufacturing: (1) the color accuracy of the three primary colors; (2) the black level of each primary color; and the (3) linearity of the luminance vs. driving voltage. Usually the three primary colors are fixed in the display, but the black level and luminance vs. voltage have some flexibility for calibration. The calibration professionals use so-called gray scale tracking to adjust the flexible parameters with the help of expensive instruments that can measure light chrominance and correlated color temperature. Customers who buy a high end new display need to pay extra money to have the display calibrated to obtain the best possible video quality out of the display.

BRIEF SUMMARY OF THE INVENTION

In one embodiment, the present invention provides a method and corresponding system for color calibration for television displays. Increasingly, most displays are becoming digital, which makes it possible to manipulate the color values in an arbitrary way before being sent to the digital display. This greatly increases the flexibility of color calibration as it is not constrained by the few possible adjustments found in non-digital TV displays. At the same time, colorimeters are becoming cheaper and accurate color LEDs are more available. As such, according to an embodiment of the present invention, a colorimeter and/or the LEDs are integrated into a remote control, so that the end users can perform calibration by themselves with guidance, using patterns delivered with a DVD-ROM.

One implementation incorporates a colorimeter on the remote control, which can measure the CIE (Commission Internationale de l'Eclairage/International Commission on Illumination) XYZ values of the color from the display. The display displaying designed color patterns and the color measurements from the remote goes directly into the display. An internal color calibration system then automatically manipulates the RGB values of the output color signal and makes the output of the display closer to the standard.

In another implementation, the remote includes two white LEDs with adjustable amount of light. The light emitted from one of the LEDs is approximately 6500K, which is set as a standard for television programs, and the other LED has approximately 5500K color temperature, which is set as a standard for movies. The calibration methods require comparison of the LED light with the gray patterns shown on the television display.

Yet another implementation integrates the above two implementations together.

These and other features, aspects and advantages of the present invention will become understood with reference to the following description, appended claims and accompanying figures.

DETAILED DESCRIPTION OF THE INVENTION

In one embodiment, the present invention provides a method and corresponding system for color calibration for television displays. Increasingly, most displays are becoming digital, which makes it possible to manipulate the color values in an arbitrary way before being sent to the digital display. This greatly increases the flexibility of color calibration as it is not constrained by the few possible adjustments found in non-digital TV displays. At the same time, colorimeters are becoming cheaper and accurate color LEDs are more available. As such, according to an embodiment of the present invention, either the colorimeter or the LEDs can be integrated into a remote control, so that the end users can do the calibration work by themselves with guidance and some patterns delivered with a DVD-ROM.

In the following, example implementations of remote controls that can be used to help the color calibration are described, and then corresponding example calibration methods which can be performed by users are described.

A first implementation incorporates the colorimeter on the remote control, which can measure the CIE (Commission Internationale de l'Eclairage/International Commission on Illumination) XYZ values of the color from the display. The display displaying designed color patterns and the color measurements from the remote goes directly into the display. An internal color calibration system then automatically manipulates the RGB values of the output color signal and makes the output of the display closer to the standard.

Specifically, the first implementation of a remote control for a television display incorporates a simple colorimeter or color sensor which measures the CIE XYZ coming out from the display. The starting and end of such measurements can be controlled by one button on the remote control. Gray scale patters for calibration can be stored in the display or be fed into the display from e.g. a DVD player.

Figure 1A:
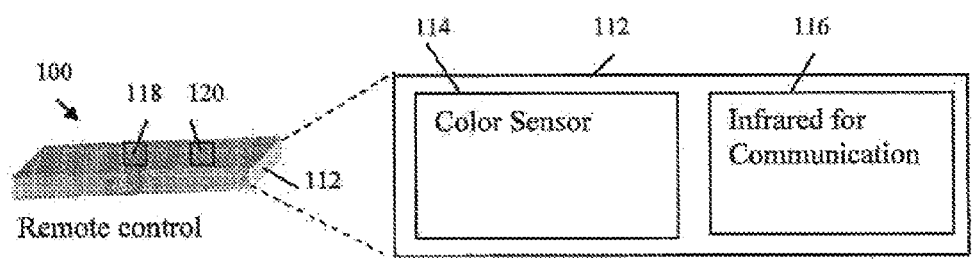
FIG. 1A shows an example diagram of a remote control according to an embodiment of the present invention.
Figure 1A:
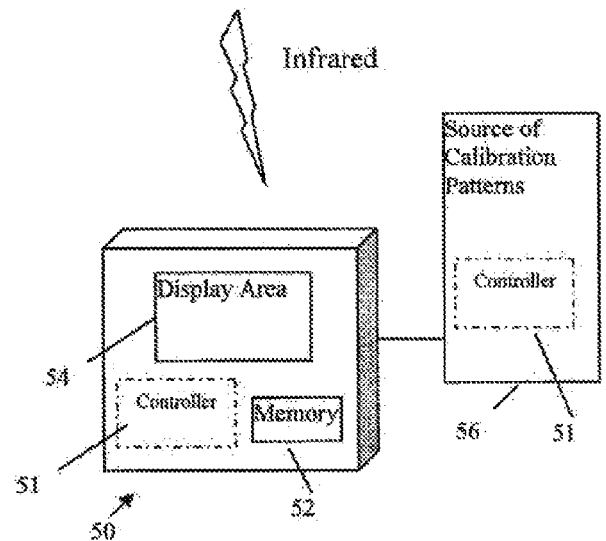

One example is remote control 100 shown in FIG. 1A, showing the top 112 of the remote control 100, incorporating a color sensor 114 and an infrared communication port 116. When the remote control 100 is aimed at a display unit (e.g., TV) and the user pushes a designated button 118 on the remote control 100, the sensor 114 measures light from the display and sends out the measured results to the display via the infrared communication port 116.

Figure 1B:
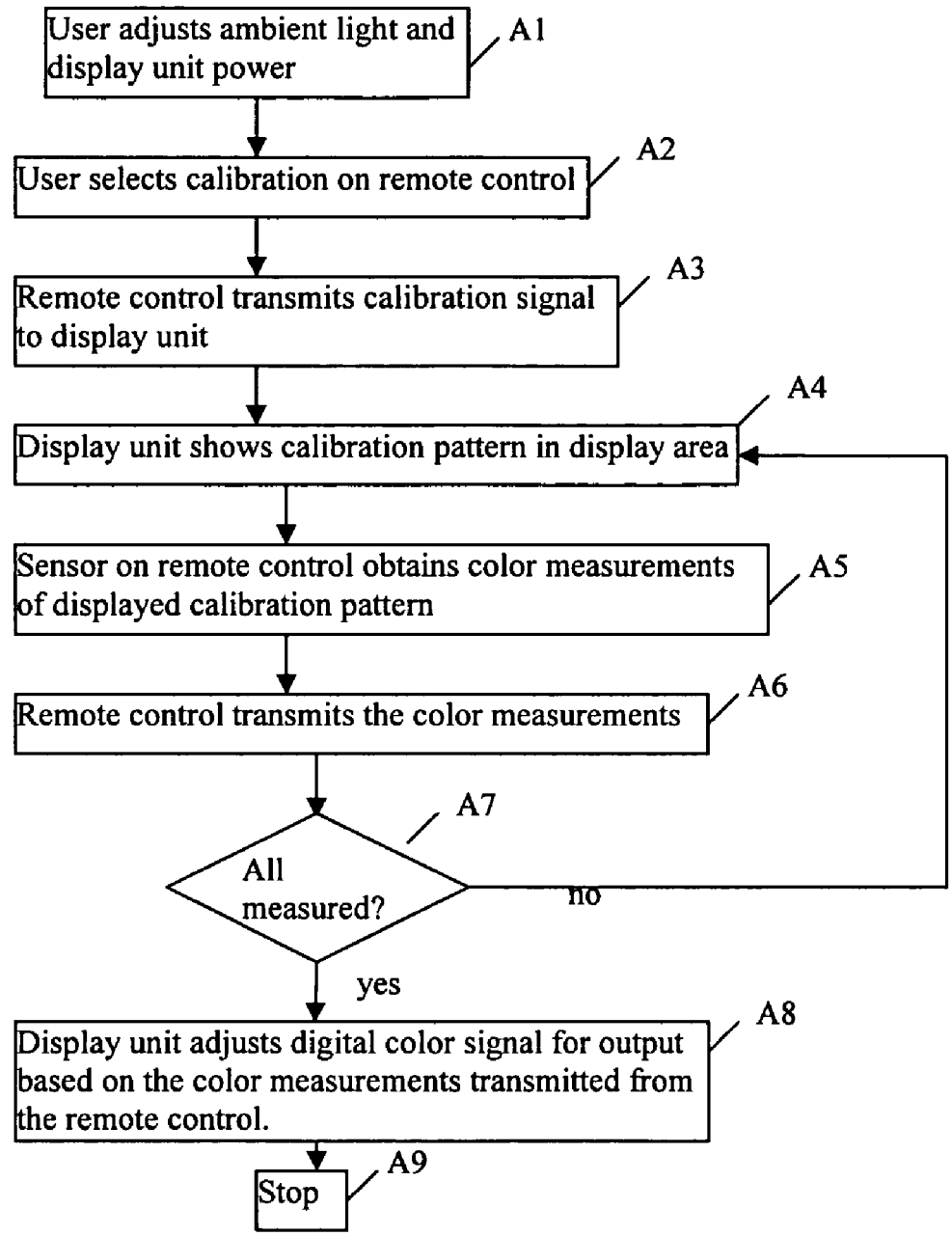
FIG. 1B shows a flowchart of example steps of calibration using a remote control, according to an embodiment of the present invention.

There are different ways of storing these preset calibration patterns. For example, the calibration patterns can be stored in memory 52 of the display unit 50. In one embodiment of the invention, a controller 51 is disposed in the display unit 50. In another embodiment of the invention, the controller is disposed in the external source 56. The controller 51, in response to remote control 100 commands, calibrates the offsets and/or gains of the display unit 50 in comparison with the light from each light source (e.g., television display area 54, LED window 404, etc.). When the calibration pattern is stored in the memory 52, the calibration process is described below, according to example steps AI-A9 in flowchart of FIG. 1B:

A1. User adjusts the environment/ambient lighting and turns on the display unit 50.
A2. User pushes a calibration button 120 on the remote control 100.
A3. The remote control 100 transmits a calibration start signal to display unit 50 via the infrared communication port 116.
A4. The display unit 50 shows the stored calibration pattern on the display area 54.
A5. The color sensor 114 on the remote control 100 obtains color measurements of displayed patterns from light output of the display area 54.
A6. The infrared communication port 116 sends out the measurements to the display unit 50.
A7. Determine if all measurement are obtained for all different calibration patterns? If not, go back to step A4 for next calibration pattern and repeat until all patterns are displayed on the display area 54 and measure, otherwise continue to step A8.
A8. Display unit 50 adjusts the digital color signal for output based on the measurements transmitted from the remote control 100 to the display unit 50.
A9. End.

As the environment lighting can disturb the measurements of the light coming out from the display area 54, before calibration, the user should make the environment lighting as dark as possible. The calibration patterns will be full frames of different colors.

If the display unit 50 does not have on-board calibration patterns, the color patterns can be fed to the display unit 50 from an external source 56, according to the following steps B1-B9 described below:

B1. User adjusts the environment lighting and hooks up the display unit 50 with external source 56 of calibration pattern (e.g., DVD player, a signal generator, etc.).
B2. User turns on the external source 56 and the display unit 50.
B3. Display unit 50 starts to show the calibration patterns from source 56 on the display area 54 one by one.
B4. User pushes a light measure button on the remote control 100.
B5. The color sensor 114 on the remote control 100 obtains color measurements from calibration patterns displayed on the display area 54.
B6. The infrared communication port 116 transmits the measurements to the display unit 50.
B7. Determine if all measurements are obtained for all different calibration patterns? If not, go back to step B4 for next calibration pattern and repeat until all patterns are displayed on the display area 54 and measured.
B8. Display unit 50 adjusts the digital color signal for output based on the measurements transmitted from the remote control 100 to the display unit 50.
B9. End.

The above steps B1-B9 are similar to steps A1-A9 further above, except that the source of calibration patterns ins external to the display unit 50.

With the above remote control 100, as shown in steps 8, the display unit 50 needs to adjust the digital color signal for the display area output based on the measurement. This can be done with the measurements of the CIE Yxy values of a set of RGB values. In one embodiment of the present invention, 16 colors are measured according to Table 1 below:

TABLE 1

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| R | 255 | 50 | 100 | 150 | 200 | 255 | 0 | 0 | 0 | 0 | 0 | 0 | 0 | 0 | 0 | 0 |
| G | 255 | 0 | 0 | 0 | 0 | 0 | 50 | 100 | 150 | 200 | 255 | 0 | 0 | 0 | 0 | 0 |
| B | 255 | 0 | 0 | 0 | 0 | 0 | 0 | 0 | 0 | 0 | 0 | 50 | 100 | 150 | 200 | 255 |

From the CIE Yxy measurements $(Y_i, x_i, Y_i, i=1, \ldots, 16)$ of the above RGB values, the average x and y values of the three primary colors are calculated according to relation set (1) below:

$$x_r = \frac{1}{5}\sum_{i=2}^{6} x_i, \quad y_r = \frac{1}{5}\sum_{i=2}^{6} y_i,$$

$$x_g = \frac{1}{5}\sum_{i=7}^{11} x_i, \quad y_g = \frac{1}{5}\sum_{i=7}^{11} y_i,$$

$$x_b = \frac{1}{5}\sum_{i=7}^{11} x_i, \quad y_b = \frac{1}{5}\sum_{i=7}^{11} y_i.$$

Further, the measured CIE Yxy can be converted to CIE XYZ values according to relation set (2) below:

$$X = x \cdot Y / y,$$
$$Y = Y,$$
$$Z = \left(\frac{1}{y} - \frac{x}{y} - 1\right) \cdot Y.$$
(2)

Figure 2:
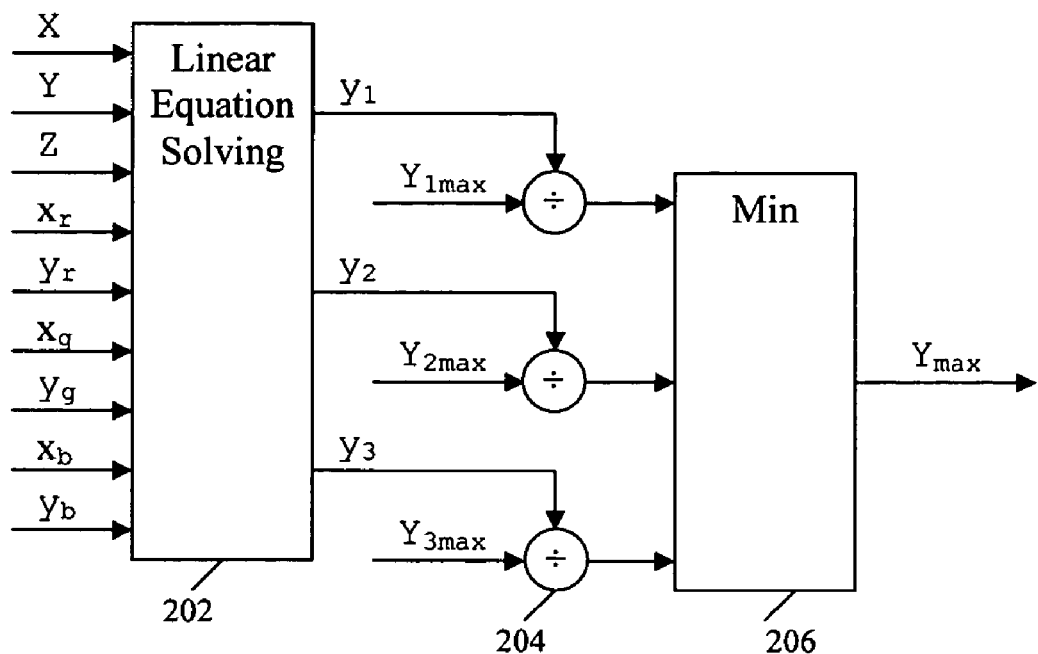
FIG. 2 shows an example block diagram of a logic for computing the maximum luminance value $Y_{max}$ of the display, wherein the input is the CIE XYZ values of SMPTE-C standard white and the averaged chrominance values of the three color primaries of the display, and the output of this block is the maximum possible luminance value of white, according to an embodiment of the present invention.

For the first signal RGB={255, 255, 255}, the corresponding Yxy value should be {1, 0.312713, 0.329016}, and the corresponding XYZ values (X, Y, Z) are computed according to relation set (2) above. With X, Y, Z) and the chrominance values of the three primary colors $(x_r, y_r)$. $(x_g, x_g)$ and $(x_b, y_b)$, the maximum luminance value $Y_{max}$ is computed as shown by the example logic 200 in FIG. 2. The logic 200 implements an example method of computing the maximum luminance value of the display unit. The input to the logic 200 is the CIEXYZ values of SMPTE-C standard white and the averaged chrominance values of the three color primaries of the display. In this example, the logic 200 and the logic 300 are in the display unit 50.

The values $Y_{1max}$, $Y_{2max}$, and $Y_{3max}$ are the measured luminance value of RGB colors [255, 0, 0], [0, 255, 0] and [0, 0, 255]. In the logic 200, a linear equation solver 202 implements the following relation (3):

$$\begin{pmatrix} 1 & 1 & 1 \\ \frac{x_r}{y_r} & \frac{x_g}{y_g} & \frac{x_b}{y_b} \\ \frac{1-x_r-y_r}{y_r} & \frac{1-x_g-y_g}{y_g} & \frac{1-x_b-y_b}{y_b} \end{pmatrix} \cdot \begin{pmatrix} y_1 \\ y_2 \\ y_3 \end{pmatrix} = \begin{pmatrix} Y \\ X \\ Z \end{pmatrix}.$$
(3)

The above linear equations (3) are solved to obtain values y1, y2 and y3, which are the corresponding proportion of the luminance contribution from the three primary colors, individually. These corresponding proportion of the luminance contributions are referred to a standard white color. Then, from the maximum achievable luminance value of each individual primary color, the pro-rated luminance values of standard white color are computed if there is no limitation on the other two primary colors. Thus, the maximum luminance value $Y_{max}$ is computed as the minimum of the three pro-rated luminance values $Y_{imax}/Y_i$, i=1, 2, 3 by the Min operator 206. The output of the logic 200 is the maximum possible luminance value of white.

Figure 3:
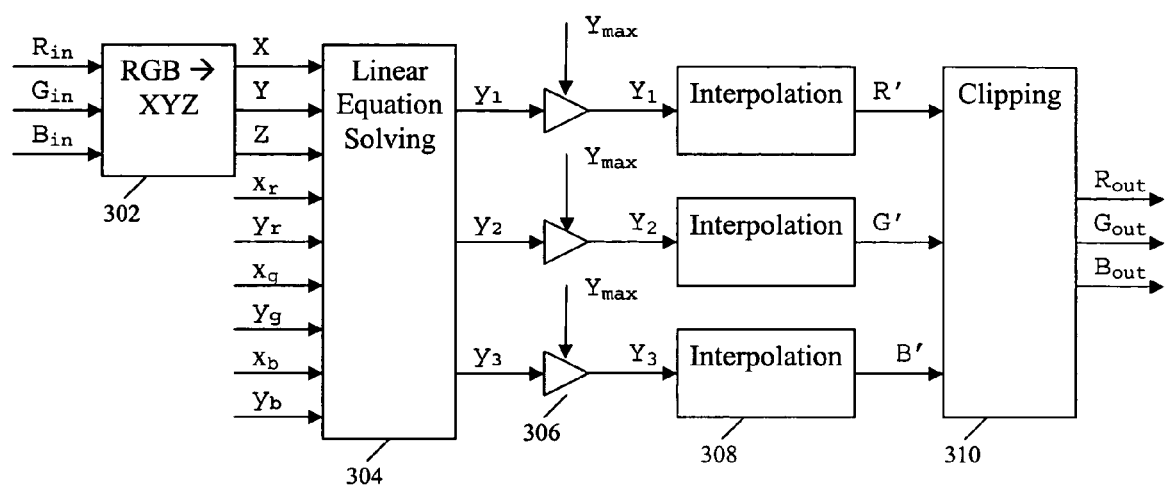
FIG. 3 shows an example logic for transforming an input color signal (RGB) to an output color signal (RGB) based on the measurements made by the remote control of FIG. 1, and the maximum white luminance value calculated, according to an embodiment of the present invention.

FIG. 3 shows an example logic 300 for transforming an input color signal to an output color signal based on the measurements made by the remote control 100 and the maximum white luminance value calculated. The output signal of logic 300 displayed on the color display area 54 and the output light is the same as the input signal displayed on a color display with standard SMPTE-C color primaries and good linearity. Referring to the example logic 300 in FIG. 3, using the maximum possible luminance value $Y_{max}$ and the chrominance values of the three primary colors $(x_r, y_r)$, $(x_g, y_g)$ and $(x_b, y_b)$, the output RGB signal $(R_{out}, G_{out}, B_{out})$ is computed from any input signal $(R_{in}, G_{in}, B_{in})$. The input RGB $(R_{in}, G_{in}, B_{in})$ values are first converted into device independent CIEXYZ coordinates by a converter 302 according to relation set (4) below:

$$\begin{pmatrix} X \\ Y \\ Z \end{pmatrix} = M_0 \begin{pmatrix} R \\ G \\ B \end{pmatrix}$$
$$= \begin{pmatrix} 0.3935 & 0.3653 & 0.1916 \\ 0.2124 & 0.7011 & 0.0866 \\ 0.0187 & 0.1119 & 0.9582 \end{pmatrix} \cdot \begin{pmatrix} R \\ G \\ B \end{pmatrix}.$$
(4)

The output XYZ values and the chrominance values of three primary colors, $(x_r, y_r)$, $(x_g, y_g)$ and $(x_b, y_b)$, are input to a linear equation solver 304 (e.g., solver 202 in FIG. 2) to calculate corresponding proportions of luminance $(Y_1, Y_2, Y_3)$ for the three primary colors.

Then combiners 306 use the maximum luminance computed earlier, to calculate the real luminance contribution $Y_i$ according to relation (5) below:

$$Y_i = Y_{max} y_i, i=1,2,3.$$
(5)

The stored measurements are used in interpolation. For each $Y_i$, i=1, 2, 3, the linear interpolator 308 first chooses two measured Y values: the upper value $\lceil Y_i \rceil$ and the lower value $\lfloor Y_i \rfloor$, where $\lceil Y_i \rceil$ is the closest Y value above $Y_i$ for color i, and $\lfloor Y_i \rfloor$ is the closest Y value below $Y_i$ for color i. Then these two Y values are used to interpolate their corresponding RGB color values based on the computed $Y_i$ according to relation set (6) below:

$$R' = \frac{\lceil Y_1 \rceil - Y_1}{\lceil Y_1 \rceil - \lfloor Y_1 \rfloor} R(\lfloor Y_1 \rfloor) + \frac{Y_1 - \lfloor Y_1 \rfloor}{\lceil Y_1 \rceil - \lfloor Y_1 \rfloor} R(\lceil Y_1 \rceil),$$
$$G' = \frac{\lceil Y_2 \rceil - Y_2}{\lceil Y_2 \rceil - \lfloor Y_2 \rfloor} G(\lfloor Y_2 \rfloor) + \frac{Y_2 - \lfloor Y_2 \rfloor}{\lceil Y_2 \rceil - \lfloor Y_2 \rfloor} G(\lceil Y_2 \rceil),$$
$$B' = \frac{\lceil Y_3 \rceil - Y_3}{\lceil Y_3 \rceil - \lfloor Y_3 \rfloor} B(\lfloor Y_3 \rfloor) + \frac{Y_3 - \lfloor Y_3 \rfloor}{\lceil Y_3 \rceil - \lfloor Y_3 \rfloor} B(\lceil Y_3 \rceil),$$
(6)

Finally, the clipper 310 clips the computed R', G' and B' to the 8 bit range, yielding the output RGB values according to relation set (7) below:

$$R_{out} = \max(0, \min(255, R')),$$
$$G_{out} = \max(0, \min(255, G')),$$
$$B_{out} = \max(0, \min(255, B')).$$
(7)

Figure 4:
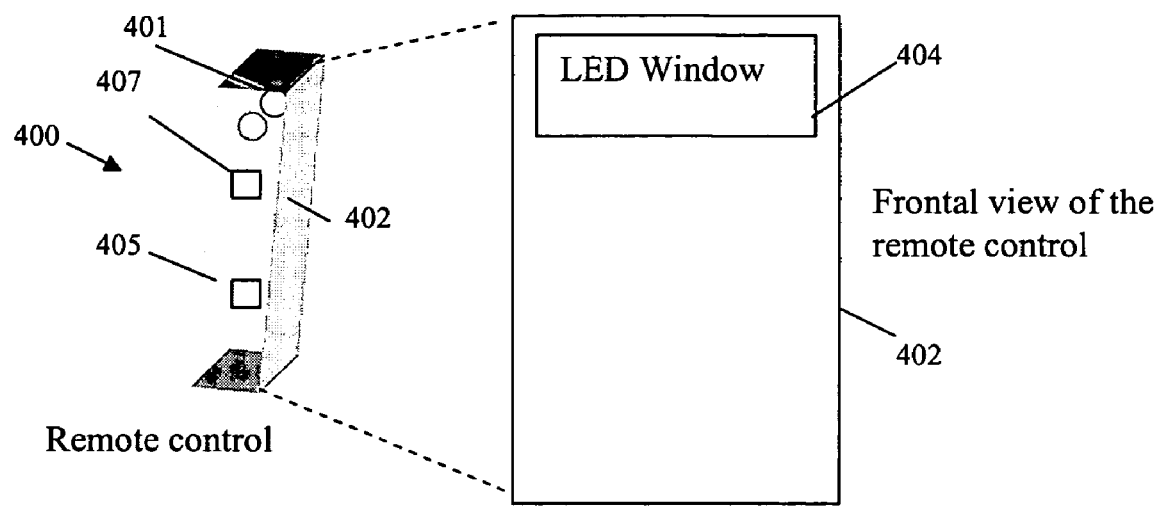
FIG. 4 shows an example diagram of another remote control according to an embodiment of the present invention.

Referring to the example in FIG. 4, in another implementation, a remote control 400 according to the present invention includes e.g. two white LEDs 401 with adjustable amount of light. The light emitted from one of the LEDs 401 is approximately 6500K, which is set as a standard for television programs, and the other LED 401 has approximately 5500K color temperature, which is set as a standard for movies. The calibration methods require comparison of one of the LED lights seen from LED window 404 with the gray patterns shown on the television display area 54 of the display unit 50.

The remote control 400 does not use color sensors so that the CIE values of light coming from the display unit 50 cannot be measured. Instead, the brightness of each LED 401 can be dimmed so it can match with the luminance out from the display area 54 of the display unit 50. The LEDs 401 are installed under the top portion 404 of the remote control 400, and covered by a diffuser (e.g., diffusion filters) so that the light from LEDs is uniform within the LED window 404 on the front 402 of the remote control 400. Top of the LED window 404 is essentially lined up with the top 401 of remote control 400, so that when comparing the LED light with the light coming out from the display unit 50, the user can see the two sources of lights seamlessly which make the comparison much easier. A switch 405 is used to switch between 5500K LED and 6500K LED. A dimmer device 407 is also incorporated in the remote control 400 so that the LED luminance can be adjusted from black to the brightest output. In addition, the remote control 400 is able to adjust the offset value and gain value for each of the three color components of the display.

Figure 5:
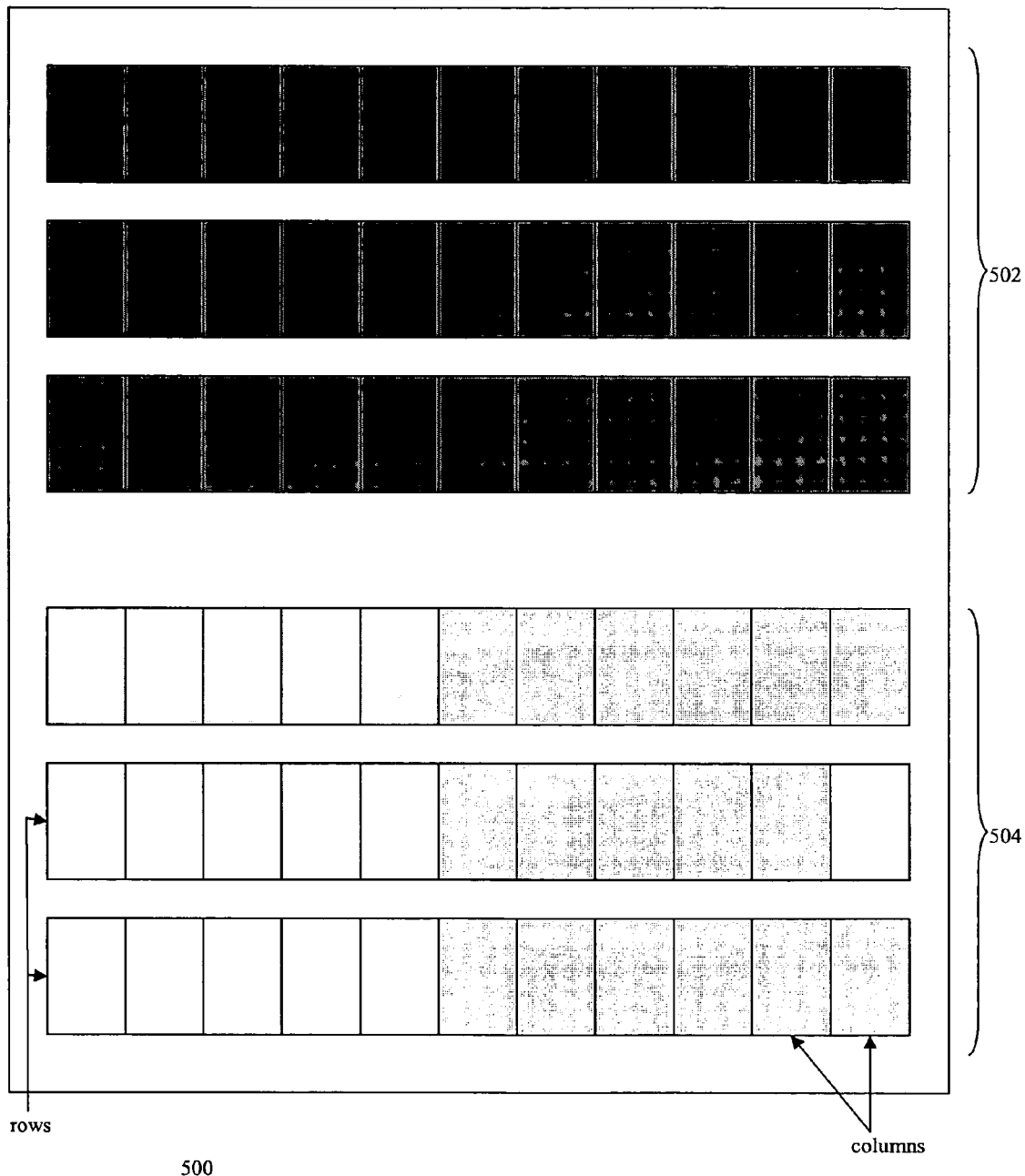
FIG. 5 shows an example calibration pattern for the remote control with LED lights.

The calibration patterns for the remote control 400 can also be generated either within the display unit 50 or by external source 56. Example calibration patterns 500 are shown in FIG. 5, which includes two blocks of patterns, one dark and one bright. Each block comprises three rows and eleven columns. The center column of each row is a gray color which has the same RGB values. The color patches in the first row of each block will have different R values which are increasing from the left column to the right column. The second row and the third row of each block have different G and B values in the same way respectively.

One block 502 patterns is the pattern in the dark region and the other block 504 of patterns is in the bright region. Each block contains three rows and 11 columns of color patches. The patterns 502, 504, can be shown together on the display area 54 or be shown line by line, repeatedly. Suppose the base value of RGB components for the dark region 502 is 30 and the base value for the bright region 504 is 240. Then, the center column of the first three rows (block 502) will have RGB values (30, 30, 30) and the first row of block 502 will have a varying red component value from 25 to 35, while the second row and third row of block 502 will have a varying green and blue component respectively in the same range. The bottom three rows (block 504) have the same variation as the top three rows (block 502) except the base value is changed from 30 to 240. With this pattern and the remote control 400, the following steps C1-C8 are carried out for color calibration:

C1. User adjusts the environment lighting and shows the pattern 500 on the display area 54.

C2. User turns on the LEDs 501.

C3. User switches the LEDs to 5500K or 6500K as needed.

C4. User compared the LED light with that of the first row of block 502, and using dimmer 407 dims/brightens the LED lights as needed for the luminance of the LED window 404 to essentially match that of pattern 500 in the display area 54.

C5. User compares the LED light with that first row of block 504, if the best match to the LED light is on the left side of the center column, the user uses the remote control to decrease the offset of RED component; otherwise uses the remote control to increases the offset of the RED component until the best match block is the center column.

C6. User compares the LED light with the other five rows (i.e., the bottom 2 rows of 502 and three rows of 504), adjust the GREEN offset, BLUE offset, RED gain, GREEN gain, and BLUE gain respectively.

C7. The user goes back to step C5 until the center column are the best matches for each row.

C8. End.

In another embodiment of the remote control incorporates the LED window, the rows of calibration pattern are shown once at a time, controlled by the remote control. The increase and decrease action of the remote are then automatically associated with the proper parameters to be adjusted. For example, if the user uses the remote control to control the display to show the second row of the pattern 500, the increase and decrease action based on the light comparison is automatically linked to the GREEN offset, wherein calibration is made easier. In this case, the following example steps D1-D10 are carried out:

D1. User adjusts the environment lighting and turns on the display.

D2. User pushes a button on the remote control marked calibration to enter calibration mode.

D3. Display 54 begins showing one row of the calibration pattern 500.

D4. User turns on the LED 401 and switches to the preferred color temperature.

D5. User adjusts the luminance of the LED using the dimmer 407.

D6. User pushes a '−' button (Vol −) if the LED matches the column on the left side of the center column in FIG. 5 and push a 'vol +' button if the LED matches the right side of the center column (the display show one row and 11 columns of 500).

D7. The remote control sends the signal to display 54 and the display 54 adjusts the corresponding offset or gain of the corresponding color component.

D8. If the match for each row is the center column in FIG. 5, user pushes the button marked "calibration" to end the calibration mode.

D9. User pushes button marked "channel +" or "channel −" and the display 54 shows the six rows (502 and 504 each contain three rows) in turn.

D10. End

Figure 6:
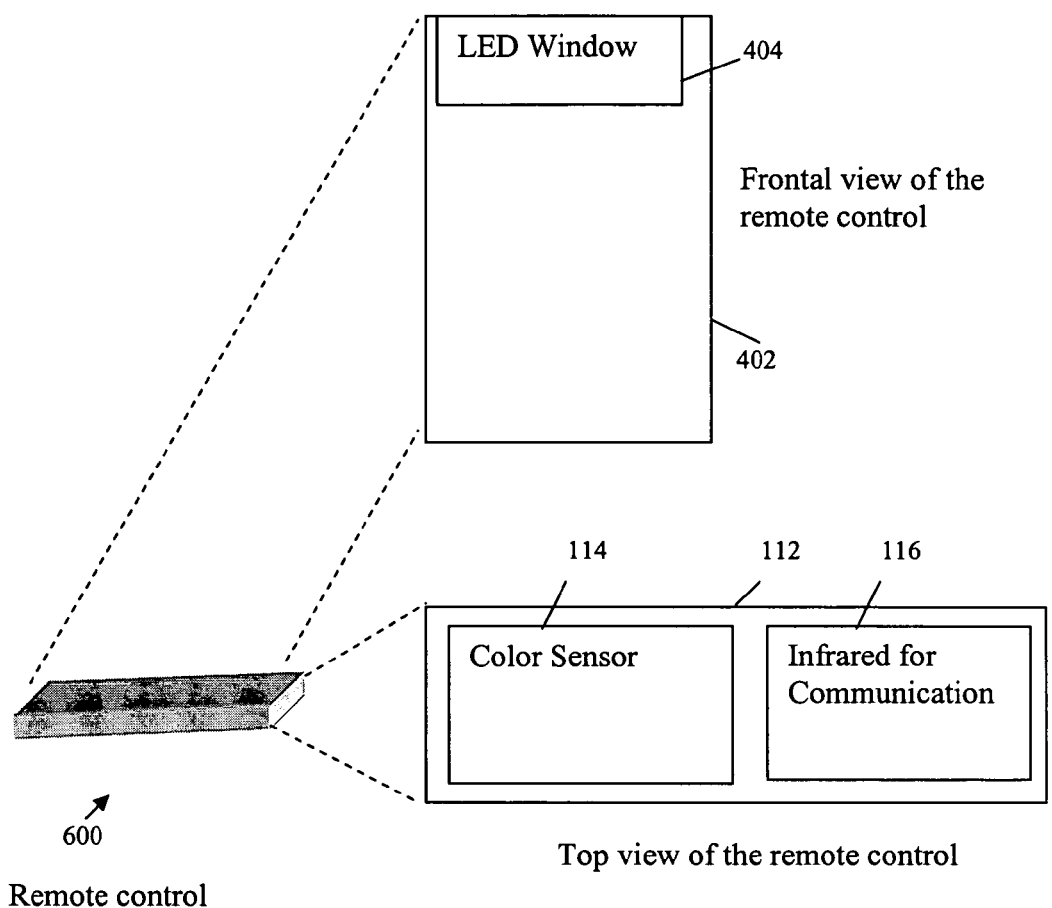
FIG. 6 shows an example diagram of another remote control according to an embodiment of the present invention which includes the features of remotes controls in FIGS. 1A and 4.

The example remote control designs 100 and 400 above (FIGS. 1A and 4) according to the present invention allow the user to calibrate the color display 54 with the remote control. Indeed, as shown in FIG. 6, these example designs 100 and 400 can be integrated together into a third example remote control 600 wherein the user can use the LEDs 401 to calibrate the offset and gains first and use the color sensors 114 to help compensate the nonstandard color primaries.

The present invention has been described in considerable detail with reference to certain preferred versions thereof; however, other versions are possible. Therefore, the spirit and scope of the appended claims should not be limited to the description of the preferred version contained herein.

What is claimed is:

1. A method of calibrating an electronic display, comprising the steps of:
   providing a remote control device including one or more essentially white light sources that can generate white light at particular color temperature or a set of color temperature, wherein the remote control further includes:
      a dimmer circuit for adjusting the luminance of the light source; and
      one or more diffusion filters for diffusing light from the light source;
   using the remote control to calibrate the offsets and/or gains of the display in comparison with the light from each light source, wherein the step of calibrating further includes the steps of:
      showing a calibration pattern on the display;
      comparing the light from each light source with the calibration pattern colors on the display; and
      using the remote control to calibrate display offset and/or gain based on the comparison results.

2. The method of claim 1 wherein the remote control further includes:

a switch to switch among the light sources for emitting white color of different color temperatures for comparison with the calibration pattern.

3. The method of claim 1 wherein the light source comprises one or more white light emitting diodes (LED).

4. The method of claim 3 wherein calibrating further includes the steps of:
showing corresponding calibration patterns on the display one by one;
visually comparing the light emitted from each with the colors of each calibration pattern on the display;
using the remote control to command the display for adjusting the particular offset and/or gain determined by each calibration pattern.

5. The method of claim 1 wherein the remote control further includes a color sensor for measuring the CIE Yxy values of the light from the display.

6. The method of claim 5 further including the steps of:
the remote control communicating with the display to transmit the sensed colors for calibrating the gain and/or offset of the display.

7. The method of claim 5 further including the steps of:
comparing the light from each light source with the sensed light from the calibration pattern colors on the display, and using the remote control to calibrate display offset and/or gain based on the comparison results.

8. The method of claim 5 further comprising the steps of aiming the remote control to the display for calibrating the display.

9. The method of claim 5 wherein the steps of calibration further includes the steps of:
showing a calibration pattern on the display;
measuring the CIE Yxy values of the color of the pattern using the sensor on the remote control;
the remote control sending back the sensed measurements to the display;
the display storing the measurements for calibration;
thereafter, the display transforming input video RGB signals to output RGB signals for display based on the stored measurements.

10. The method of claim 1 further comprising the steps of providing the calibration pattern to the display from an external pattern signal generator.

11. The method of claim 1 further comprising the steps of the display generating the calibration pattern for display.

12. The method of 9 wherein the steps of transforming further includes the steps of:
computing the maximum luminance of possible white color in compliance with the standard SMPTE-C; converting the input RGB signal to an XYZ signal;
solving the linear equations for the correct proportions of R, G, B luminance;
computing the absolute R, G, B luminance values; using the stored measurement for computing the corresponding R, G, B values by linear interpolation; and
clipping the computed RGB values to obtain in-range output RGB values.

13. The method of 9 wherein the step of computing the maximum luminance of possible white color further includes the steps of:
computing the XYZ values of SMPTE-C white;
computing the average chrominance values of stored measurements for the three color components;
solving the proportions of R, G, B luminance values;
based on the maximum luminance value of each component, obtaining the maximum possible luminance of white that complies with SMPTE-C standard.

14. The method of claim 1 wherein the remote control further includes a light source that generates white of one or more particular temperatures, and a color sensor to measure the CIE Yxy values of the light coming out from the display for comparison with the light from the light source.

15. The method of claim 1 wherein the calibration pattern comprises two blocks of patterns, one dark and one bright, each block including three rows and eleven columns, the center column of each row including a gray color which same RGB values, color patches in the first row of each block having different R values which are increasing from the left column to the right column, and a second row and a third row of each block have different G and B values in the same way, respectively.

16. The method of claim 1 wherein the calibration pattern comprise sixteen gray for each color component R, G, B:

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| R | 255 | 50 | 100 | 150 | 200 | 255 | 0 | 0 | 0 | 0 | 0 | 0 | 0 | 0 | 0 | 0 |
| G | 255 | 0 | 0 | 0 | 0 | 0 | 50 | 100 | 150 | 200 | 255 | 0 | 0 | 0 | 0 | 0 |
| B | 255 | 0 | 0 | 0 | 0 | 0 | 0 | 0 | 0 | 0 | 0 | 50 | 100 | 150 | 200 | 255. |

17. A calibration system for calibrating an electronic display, comprising:
a remote control including one or more essentially white light sources that can generate white light at particular color temperature or a set of color temperatures;
a controller that in response to remote control commands calibrates the offsets and/or gains of the display in comparison with the light from each light source, wherein the display shows a calibration pattern for comparing the light from each light source with the calibration pattern colors; and
the remote control commands the controller to calibrate display offset and/or gain based on the comparison results, wherein the remote control further includes:
a dimmer circuit for adjusting the luminance of the light source; one or more diffusion filters for diffusing light from the light source.

18. The system of claim 17 wherein the remote control further includes:
a switch to switch among the light sources for emitting white color of different color temperatures for comparison with the calibration pattern.

19. The system of claim 17 wherein the light source comprises one or more white light emitting diodes (LED).

20. The system of claim 19 wherein the displays shows corresponding calibration patterns on the display one by one for comparing the light emitted from each with the colors of each calibration pattern on the display, and the remote control commands the display for adjusting the particular offset and/or gain determined by each calibration pattern.

21. The system of claim 17 wherein the remote control further includes a color sensor for measuring the CIE Yxy values of the light from the display.

22. The system of claim 21 wherein the remote control communicating with the display to transmit the sensed colors for calibrating the gain and/or offset of the display.

23. The system of claim 21 wherein the light from each light source is compared with the sensed light from the calibration pattern colors on the display, and the remote control commands the display to calibrate display offset and/or gain based on the comparison results.

24. The system of claim 21 wherein the remote control is aimed to the display for calibrating the display.

25. The system of claim 21 wherein the CIE Yxy values of the color of the pattern are measured using the sensor on the remote control, and the remote control sends back the sensed measurements to the display, such that the display stores the measurements for calibration, and thereafter, the display transforms input video RGB signals to output RGB signals for display based on the stored measurements.

26. The system of claim 17 wherein the calibration pattern to the display is from an external pattern signal generator.

27. The system of claim 17 wherein the display controller generates the calibration pattern for display.

28. The system of claim 25 further comprising logic that performs processes including:
computing the maximum luminance of possible white color in compliance with the standard SMPTE-C;
converting the input RGB signal to an XYZ signal;
solving the linear equations for the correct proportions of R, G, B luminance;
computing the absolute R, G, B luminance values;
using the stored measurements for computing the corresponding R, G, B values by linear interpolation; and
clipping the computed RGB values to obtain in-range output RGB values.

29. The system of claim 25 wherein the logic for computing the maximum luminance of possible white color further performs:
computing the XYZ values of SMPTE-C white;
computing the average chrominance values of stored measurements for the three color components;
solving the proportions of R, G, B luminance values;
based on the maximum luminance value of each component, obtaining the maximum possible luminance of white that complies with SMPTE-C standard.

30. The system of claim 17 wherein the remote control further includes a light source that generates white of one or more particular temperatures, and a color sensor to measure the CIE Yxy values of the light coming out from the display for comparison with the light from the light source.

* * * * *